US012811117B2

(12) United States Patent
Burton et al.

(10) Patent No.: US 12,811,117 B2
(45) Date of Patent: Nov. 24, 2026

(54) DATA STORAGE FOR TOF INSTRUMENTATION

(71) Applicant: DH Technologies Development Pte. Ltd., Singapore (SG)

(72) Inventors: Lyle L. Burton, Woodbridge (CA); Nic Bloomfield, Newmarket (CA); David Michael Cox, Toronto (CA)

(73) Assignee: DH Technologies Development Pte. Ltd., Singapore (SG)

( * ) Notice: Subject to any disclaimer, the term of this patent is extended or adjusted under 35 U.S.C. 154(b) by 383 days.

(21) Appl. No.: 18/571,542

(22) PCT Filed: Jun. 24, 2022

(86) PCT No.: PCT/IB2022/055895

§ 371 (c)(1),
(2) Date: Dec. 18, 2023

(87) PCT Pub. No.: WO2022/269565

PCT Pub. Date: Dec. 29, 2022

(65) Prior Publication Data

US 2024/0282560 A1 Aug. 22, 2024

Related U.S. Application Data

(60) Provisional application No. 63/215,217, filed on Jun. 25, 2021.

(51) Int. Cl.
*H01J 49/00* (2006.01)
*H01J 49/40* (2006.01)
*H01J 49/42* (2006.01)

(52) U.S. Cl.
CPC ...... *H01J 49/0031* (2013.01); *H01J 49/0036* (2013.01); *H01J 49/40* (2013.01); *H01J 49/4215* (2013.01)

(58) Field of Classification Search
CPC .... H01J 49/0031; H01J 49/0036; H01J 49/40; H01J 49/4215; H01J 49/0045
See application file for complete search history.

(56) References Cited

U.S. PATENT DOCUMENTS 5,367,162 A * 11/1994 Holland .................. H01J 49/40 250/283
6,229,142 B1 * 5/2001 Bateman ............... H01J 49/025 250/288

(Continued)

FOREIGN PATENT DOCUMENTS

EP 2819148 12/2014
WO 2016/125060 8/2016

(Continued)

OTHER PUBLICATIONS

Bimpikis et al., "BLAST2RS, a web server for flexible retrieval of related proteins sequences in the SWISS-PROT and SPTrEMBL databases", Nucleic Acids Res, Jul. 1, 2003; 31(13):3792-4.

(Continued)

*Primary Examiner* — David A Vanore
(74) *Attorney, Agent, or Firm* — Merchant & Gould P.C.

(57) ABSTRACT

The technology relates to systems and methods for performing mass spectrometry analysis of a sample. An example method may include receiving, as input via an input device, a target mass-to-charge (m/z) ratio for a fragment ion of interest; setting a target m/z range based on the target m/z ratio; ionizing the sample to generate precursor ions; fragmenting the precursor ions to generate fragment ions having a range of mass-to-charge ratios larger than the target m/z range; accelerating the fragment ions to a detector such that fragment ions inside and outside of the target m/z ratio are detected; summing a count of fragment ions within the target m/z range without storing ion counts for fragment ions (Continued)

outside of the target m/z range; and storing the summed ion count as corresponding with the target mass-to-charge ratio.

20 Claims, 7 Drawing Sheets

(56) References Cited

U.S. PATENT DOCUMENTS

| | | | | |
|---|---|---|---|---|
| 6,770,871 | B1 * | 8/2004 | Wang | H01J 49/004 250/281 |
| 7,041,968 | B2 * | 5/2006 | Enke | H01J 49/40 250/281 |
| 7,714,275 | B2 * | 5/2010 | Hofstadler | H01J 49/0027 250/281 |
| 7,923,681 | B2 | 4/2011 | Collings et al. | |
| 8,809,770 | B2 | 8/2014 | Bonner et al. | |
| 9,442,887 | B2 | 9/2016 | Tate et al. | |
| 10,068,753 | B2 | 9/2018 | Bloomfield et al. | |
| 10,325,768 | B1 | 6/2019 | Stearns | |
| 10,651,019 | B2 | 5/2020 | Ivosev et al. | |
| 10,770,277 | B2 | 9/2020 | Datwani et al. | |
| 2004/0164239 | A1 * | 8/2004 | Franzen | H01J 49/0031 250/288 |
| 2004/0238755 | A1 * | 12/2004 | Lee | H01J 49/063 250/423 R |
| 2005/0040326 | A1 * | 2/2005 | Enke | H01J 49/40 250/288 |
| 2005/0212869 | A1 | 9/2005 | Ellson | |
| 2005/0218319 | A1 * | 10/2005 | Bandura | H01J 49/0431 250/288 |
| 2005/0270191 | A1 * | 12/2005 | Hofstadler | H01J 49/0036 341/50 |
| 2006/0138318 | A1 * | 6/2006 | Enke | H01J 49/0045 250/287 |
| 2008/0203290 | A1 * | 8/2008 | Fernandez de la Mora | H01J 49/4215 250/281 |
| 2008/0296490 | A1 * | 12/2008 | Hidalgo | H01J 49/40 250/281 |
| 2009/0266983 | A1 * | 10/2009 | Yamamoto | H01J 49/0036 250/287 |
| 2010/0163721 | A1 * | 7/2010 | Graves | G01N 33/6818 250/282 |
| 2012/0016598 | A1 * | 1/2012 | Deininger | H01J 49/164 702/28 |
| 2012/0208224 | A1 * | 8/2012 | Lemoine | G01N 33/6848 435/23 |
| 2012/0309027 | A1 | 12/2012 | Anderson | |
| 2013/0080073 | A1 | 3/2013 | De Corral | |
| 2013/0096847 | A1 | 4/2013 | Yamaguchi | |
| 2013/0171459 | A1 | 7/2013 | Wang et al. | |
| 2013/0268212 | A1 * | 10/2013 | Makarov | H01J 49/0036 702/32 |
| 2015/0364305 | A1 * | 12/2015 | Wang, Jr. | G01N 27/623 250/282 |
| 2016/0172171 | A1 * | 6/2016 | Wang | H01J 49/0036 702/196 |
| 2017/0044619 | A1 * | 2/2017 | Rose | C12Q 1/6883 |
| 2017/0299550 | A1 * | 10/2017 | Wang | H01J 49/004 |
| 2018/0068837 | A1 | 3/2018 | Makarov | |
| 2019/0147983 | A1 | 5/2019 | Shan et al. | |
| 2019/0157061 | A1 | 5/2019 | Datwani | |
| 2020/0003739 | A1 | 1/2020 | Yamamoto | |
| 2020/0158697 | A1 | 5/2020 | Jensen | |
| 2020/0194245 | A1 * | 6/2020 | Smith | H01J 49/4225 |
| 2020/0258728 | A1 * | 8/2020 | Höhndorf | H01J 49/164 |
| 2021/0003551 | A1 * | 1/2021 | Hudson | G01N 35/0092 |
| 2021/0109069 | A1 | 4/2021 | Jones | |
| 2021/0293764 | A1 | 9/2021 | Tate | |
| 2022/0187260 | A1 | 6/2022 | Bloomfield | |
| 2023/0335384 | A1 * | 10/2023 | Ryumin | H01J 49/0036 |
| 2023/0343574 | A1 * | 10/2023 | Chen | H01J 49/0031 |
| 2024/0014021 | A1 * | 1/2024 | Hagedorn | H01J 49/40 |
| 2024/0282560 | A1 * | 8/2024 | Burton | H01J 49/0031 |
| 2024/0371474 | A1 | 11/2024 | Duchoslav | |
| 2024/0371618 | A1 * | 11/2024 | Mourad | H01J 49/0036 |
| 2024/0418686 | A1 | 12/2024 | Liu | |
| 2024/0428893 | A1 | 12/2024 | Tate | |
| 2025/0022700 | A1 | 1/2025 | Tate | |
| 2025/0125134 | A1 | 4/2025 | Liu | |
| 2025/0130210 | A1 | 4/2025 | Liu | |

FOREIGN PATENT DOCUMENTS

| | | |
|---|---|---|
| WO | 2019/239332 | 12/2019 |
| WO | 2021/234643 | 11/2021 |

OTHER PUBLICATIONS

Gessault, Siegfried et al., "Prosit: proteome-wide prediction of peptide tandem mass spectra by deep learning", Nature Methods, Nature Publishing Group, New York, US, vol. 16, No. 6, May 27, 2019, pp. 509-518.

Habe, Tim et al., "Supporting information for Ultrahigh-throughput ESI-MS: Sampling pushed to six samples per second by acustic ejection mass spectrometry", Analytical Chemistry, vol. 92, No. 18, Aug. 3, 2020, pp. 12242-12249, pp. S1-S19.

Habe, Tim et al., "Ultrahigh-throughput ESI-MS: Sampling pushed to six samples per second by acoustic ejection mass spectrometry", Analytical Chemistry, vol. 92, No. 18, Aug. 3, 2020, pp. 12242-12249.

Krasny, Lukas et al., "Data-independent acquisition mass spectrometry (DIA-mS) for proteomic applications in oncology", Molecular Omics, vol. 17, No. 1, Oct. 9, 2020, pp. 29-42.

Li, Ka Wan et al., "Recent developments in data independent acquisition (DIA) mass spectrometry: Applications of quantitative analysis of the brain proteome", Frontiers in Molecular Neuroscience, vol. 13, Dec. 23, 2020, 8 pages.

Lou, Ronghui et al., "A hybrid spectral library combining DIA-MS data and targeted virtual library substantially deepens the proteome coverage", ISCIENCE, vol. 23, No. 3, Feb. 12, 2020, 45 pages.

Yang, Yi et al., "In silico spectral libraries by deep learning facilitate data-independent acquisition proteomics", Nature Communications, vol. 11, No. 1, Dec. 1, 2020, 11 pages.

"Welcome to Vital-IT", 2022, SIB Swiss Institute of Bioinformatics, 1 page.

Anonymous, MassBank, "MassBank User's Manual version 2.4", Feb. 7, 2012, XP055621314, retrieved from the internet on Sep. 11, 2019 at: https://massbank.eu/MassBank/manuals/UserManual_en.pdf, 33 pages.

Chen, Huanwen et al., "Desorption Electrospray Ionization Mass Spectrometry for High-Throughput Analysis of Pharmaceutical Samples in the Ambient Environment", Analytical Chemistry, vol. 77, No. 21, Nov. 1, 2005, pp. 6915-6927.

Hager et al., "Product ion scanning using a Q-q-Q linear ion trap (Q Trap) mass spectrometer", Rapid Communications in Mass Spectrometry, 2003; 17: 1056-1064.

Haseeb Muhammed et al., "LBE: A Computational Load Balancing Algorithm for Speeding up Parallel Peptide Search in Mass-Spectrometry Based Proteomics", 2019 IEEE International Parallel and Distributed Processing Symposium Workshops (IPDPSW), IEEE, May 20, 2019, pp. 191-198.

Horlacher, Oliver et al., "Mining Large Scale Tandem Mass Spectrometry Data for Protein Modifications Using Spectral Libraries", Journal of Proteome Research, ACS Publications, 2016, 15, 721-731.

Jansen, Bas et al., "MassyTools: A High-Throughput Targeted Data Processing Tool for Relative Quantitation and Quality Control Developed for Glycolic and Glycoproteomic MALDI-MS", Journal of Proteome Research, vol. 14, No. 12, Dec. 4, 2015, pp. 5088-5098.

Kim, Kwang Hoe, et al., "Quantitative analysis of low-abundance serological proteins with peptide affinity-based enrichment and pseudo-multiple reaction monitoring by hybrid quadrupole time-of-flight mass spectrometry", Elsevier, Analytica Chimica Acta, 882 (2015) 38-48.

(56) References Cited

OTHER PUBLICATIONS

Kotsias, Maximilianos et al., A semi-automated, high throughput approach for O-glycosylation profiling of in vitro established cancer cell lines by MALDI-FT-ICR MS, Glycoconjugate Journal, Chapman and Hall, Boston, vol. 38, No. 6, Jul. 20, 2021, 747-756.
Liu et al., "Acoustic Ejection/Full-Scan Mass Spectrometry Analysis for High-Throughput Compound Quality Control", SLAS Technology, 2021, 178-188. ASMS 2021.
Liu, Chang et al., "Operational Modes and Speed Considerations of an Acoustic Droplet Dispenser for Mass Spectrometry", Analytical Chemistry, vol. 92, No. 24, Oct. 16, 2020, pp. 15818-15826.
Martens, Lennart et al., "mzML—a community standard for mass spectrometry data", Molecular and Cellular proteomics: MCP vol. 10, 1 (2011): R110.000133, doi: 1074/mcp.R110.000133, 7 pages.
Misra, Biswapriya et al., "New software tools, databases, and resources in metabolomics: updates from 2020", Metabolomics, Springer, vol. 17, No. 5, May 1, 2021, 24 pages.
Mohammad, Umair et al., "Simulation Testbed for Evaluating Distributed Querying and Searching of Mass Spectrometry Big Data in a Network-Based Infrastructure", 2021 IEEE Seventh International Conference on Big Data Computing Service and Applications (BIGDATASERVICE), IEEE, Aug. 23, 2021, pp. 137-142.
Nicolardi, Simone et al., "Quality control based on isotopic distributions for high-throughput MALDI-TOF and MALDI-FTICR serum peptide profiling", Journal of the American Society for Mass Spectrometry, Elsevier Science, Inc, vol. 21, No. 9, Nov. 22, 2011, 11 pages.
PCT International Preliminary Reporton Patentability in Application PCT/IB2022/055895, mailed Jan. 4, 2024, 14 pages.
PCT International Search Report and Written Optinion in Application PCT/IB2022/055895, mailed Sep. 27, 2022, 18 pages.
Stefanelli, Patrizia et al., "A survey on long-term stability of stock standard solutions in pesticide residue analysis", Food Analytical Methods, Springer, NY,vol. 8, No. 5, Sep. 19, 2014, pp. 1164-1172.
Veltri, P. et al., "Sharing mass spectrometry data in a grid-based distributed proteomics laboratory", Information Processing and Management, Elsevier, GB, vol. 43, No. 3, Jan. 27, 2007, pp. 571-591.
Veselkov, Kirill et al., "BASIS: High-performance bioinformatics platform for processing of large-scale mass spectrometry imaging data in chemically augmented histology", Scientific Reports, vol. 8, No. 4053, Mar. 6, 2018, pp. 1-11.
Zhang, Hui et al., "Acoustic ejection mass spectrometry for high-throughput analysis", Analytical Chemistry, vol. 93, No. 31, Jul. 28, 2021, pp. 10850-10861.
Zhang, Hui et al., "Acoustic Ejection Mass Spectrometry for high-throughput analysis", bioRxiv, Jan. 29, 2020, URL:https://www.biorxiv.org/content/10.1101/2020.01.28.923938v1.full.pdf retrieved on Sep. 8, 2021, pgs.
Zhang, Zhongqi. et al., "A Universal Alorithm for Fast and Automated Charge State Deconvolution of Electrospray Mass-to-Charge Ratio Spectra", Journal of the American Society for Mass Spectrometry, Elsevier, vol. 9, No. 3, Mar. 1, 1998, pp. 225-233.
Zubarev, Roman et al., "Orbitrap Mass Spectrometry" Analytical Chemistry, vol. 85, No. 11, Apr. 16, 2023, pp. 5288-5296.
Bouyssie, David et al., "mzDB: A File Format Using Multiple Indexing Strategies for the Efficient Analysis of Large LC-MS/MS and SWATH-MS Data Sets", Molecular and Cellular Proteomics, vol. 14, No. 3, Dec. 11, 2014, pp. 771-781.
Handy, Kyle et al., "Fast, axis-agnostic, dynamically summarized storage and retrieval for mass spectrometry data", PLOS ONE, vol. 12, No. 11, Nov. 15, 2017, 14 pages.
Nasso, Sara et al., "An Optimized Data Structure for High-Throughput 3D Proteomics Data: mzTree", ARXIV.org, Cornell Univ. Library, Feb. 19, 2010, 10 pages.
Willems, Sander et al., "AlphaTims: Indexing Trapped Ion Mobility Spectrometry-TOF Data for Fast and Easy Accession and Visualization", Molecular and Cellular Proteomics, vol. 20, Sep. 17, 2021, 12 pages.

* cited by examiner

300

DATA STORAGE FOR TOF INSTRUMENTATION

CROSS REFERENCE TO RELATED APPLICATION

This application is a National Stage Application of PCT/IB2022/055895, filed on Jun. 24, 2022, which claims the benefit of U.S. Provisional Application No. 63/215,217, filed on Jun. 25, 2021, the entire disclosures of which are incorporated herein by reference in their entireties. To the extent appropriate, a claim of priority is made to each of the above disclosed applications.

BACKGROUND

Mass spectrometers may operate in a variety of different modes. One mode that may be used through multiple reaction monitoring ("MRM") or selective reaction monitoring ("SRM"), which is a mass spectrometry technique that can selectively quantify compounds within complex mixtures. This technique may use a triple quadrupole mass spectrometer that firstly targets the ion corresponding to the compound of interest with subsequent fragmentation of that target ion to produce a range of fragment ions. One or more of these fragment ions can be selected for quantitation. Only compounds that meet both these criteria, e.g., specific parent ions and specific fragment ions corresponding to the mass of the molecule of interest, are isolated within the mass spectrometer.

Another mode that mass spectrometers are typically run is a time-of-flight ("TOF") analysis. TOF mass spectrometry concurrently measures a wider range of mass-to-charge ratios with improved speed, which may help retain additional information. The increased mass resolving power and mass accuracy of time-of-flight mass analyzers may help identify compounds and characterize complex mixtures.

SUMMARY

In an aspect, the technology relates to a method for performing mass spectrometry analysis of a sample. The method includes receiving, as input via an input device, a target mass-to-charge (m/z) ratio for a fragment ion of interest; setting a target m/z range based on the target m/z ratio; ionizing the sample to generate precursor ions; fragmenting the precursor ions to generate fragment ions having a range of mass-to-charge ratios larger than the target m/z range; accelerating the fragment ions to a detector such that fragment ions inside and outside of the target m/z ratio are detected; summing a count of fragment ions within the target m/z range without storing ion counts for fragment ions outside of the target m/z range; and storing the summed ion count as corresponding with the target mass-to-charge ratio.

In an example, the method further includes calculating an amount of an analyte present in the sample based on the stored summed ion count. In another example, detection of the fragment ions is performed with a mass analyzer that is one of a time-of-flight (TOF) mass analyzer, an orbitrap mass analyzer, or a Fourier-transform ion cyclotron resonance mass analyzer. In still another example, the method further includes setting a first target m/z subrange that is smaller than the target m/z range; setting a second target m/z subrange that is smaller than the first target m/z subrange; summing a count of fragment ions within the first target m/z subrange as a first subrange count; summing a count of fragment ions within the second target m/z subrange as a second subrange count; and storing the first subrange count and the second subrange count. In yet another example, the method further includes based on the target m/z ratio, setting analyte-based m/z range that is based on one or more characteristics of an analyte for the sample, wherein the analyte-based m/z range is included in the target m/z range. In a further example, the target m/z range is further based on at least one of a charge state or an isotopic cluster of the target compound. In still yet another example, the method further includes converting the target m/z range to an arrival time range; and wherein summing a count of fragment ions includes summing the count of ions arriving at the detector during the arrival time range.

In another aspect, the technology relates to a mass spectrometry system. The system includes an ionization device for ionizing a sample into precursor ions; a dissociation device configured to fragment precursor ions into fragment ions; and a mass analyzer, including a detector, for detecting the fragment ions from the dissociation device, wherein the mass analyzer is one of a time-of-flight (TOF) mass analyzer, an orbitrap mass analyzer, or a Fourier-transform ion cyclotron resonance mass analyzer. The system also includes an input device for receiving input; at least one processor; and memory storing instructions that, when executed by the at least one processor, cause the system to perform operations. The operations include receive, as input via the input device, a target mass-to-charge (m/z) ratio for a fragment ion of interest; set a target m/z range based on the target m/z ratio; ionize, by the ionization device, the sample to generate precursor ions; fragment, by the dissociation device, the precursor ions to generate fragment ions having a range of mass-to-charge ratios larger than the target m/z range; detect, by the mass analyzer, the fragment ions; sum a count of fragment ions within the target m/z ratio without storing ion counts for fragment ions outside of the target m/z range; and store the summed ion count as corresponding with the target mass-to-charge ratio.

In an example, the operations further include calculate an amount of an analyte present in the sample based on the stored summed ion count. In another example, the target m/z range is based on additional input received via the input device. In a further example, the system further includes a quadrupole for filtering the precursor ions. In still another example, the operations further include filter, by the quadrupole, the precursor ions based on a user input. In yet another example, the mass analyzer is a TOF mass analyzer and the operations further include: convert the target m/z range to an arrival time range; and wherein summing the count of fragment ions includes summing the count of ions arriving at the detector during the arrival time range. In still yet another example, the operations further include: convert the target m/z range to an arrival time range; and wherein summing a count of fragment ions includes summing a count of ions arriving at the detector during the arrival time range.

In another aspect, the technology relates to a method for performing mass spectrometry analysis of a sample. The method includes receiving, as input via an input device, a first target mass-to-charge (m/z) ratio and a second target m/z ratio for fragment ions of interest; setting a first target m/z range based on the first target m/z ratio; setting a second target m/z range based on the second target m/z ratio; ionizing the sample to generate precursor ions; fragmenting the precursor ions to generate fragment ions having a range of mass-to-charge ratios larger than, and including, the first target m/z range and the second target m/z range; accelerating the fragment ions to a detector such that fragment ions inside and outside of the first target m/z ratio and the second m/z ratio are detected; summing a count of fragment ions within the first target m/z range as a first summed ion count; summing a count of fragment ions within the second target m/z range as a second summed ion count; storing the first summed ion count as corresponding to the first target m/z ratio without storing the mass-to-charge dimension for each of the fragment ions; and storing the second summed ion count as corresponding to the second target m/z ratio without storing the mass-to-charge dimension for each of the fragment ions.

In an example, the method further includes calculating an amount of a first analyte present in the sample based on the stored first summed ion count; and calculating an amount of a second analyte present in the sample based on the stored second summed ion count. In another example, the method further includes calculating an amount of an analyte present in the sample based on the stored first summed ion count and the second summed ion count. In a further example, the method further includes converting the first target m/z range to a first arrival time range; converting the second target m/z range to a second arrival time range; and wherein summing a count of fragment ions includes summing the count of ions arriving at the detector during the first arrival time range and the second arrival time range. In yet another example, the method includes converting the first target m/z range to a first frequency range; converting the second target m/z range to a second frequency range; and wherein summing a count of fragment ions includes summing the count of ions having a detected frequency in the first frequency range and the second frequency range. In still another example, detection of the fragment ions is performed using a mass analyzer that is one of a time-of-flight (TOF) mass analyzer, an orbitrap mass analyzer, or a Fourier-transform ion cyclotron resonance mass analyzer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
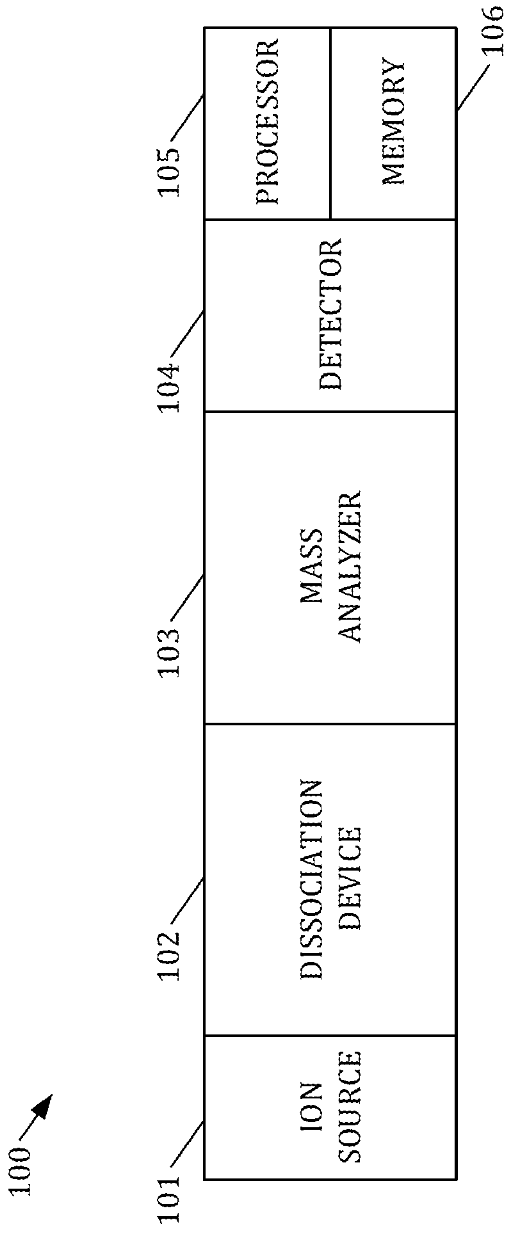
FIG. 1 depicts an example system for performing mass spectrometry.

As briefly discussed above, an MRM analysis performed with a triple quadrupole MS system can be useful in a variety of experiments and analyses, but MRM may have limited selectivity and accuracy. On the other hand, a TOF analysis has high selectivity, but results in a very large amount of data. For instance, in a TOF analysis, hundreds of thousands of data points may be recorded multiple times per second because TOF records a large spectrum, which may span hundreds of Daltons (Da).

As an example, MS/MS spectra acquired from TOF, or other accurate mass instrumentation (e.g., Orbitrap, Fourier Transform, etc.), as a full spectra, even where only a few portions of the spectra may ultimately be of interest. After the spectra are acquired, particular portions of the spectra (e.g., particular peaks) may be analyzed to determine ion counts of product ions at particular m/z positions. Such a process is different from MRM acquisition on a triple quadrupole instrument where a single intensity is stored for each target m/z (for each 'cycle' or scan or time point). While there are some benefits from having full spectra as provided by a TOF or other accurate mass instrument, when the experiment is for purely targeted workflows, there are also some disadvantages as compared to triple quadrupole MRM. First, the data file size for MRM is much smaller—this makes these files less expensive and easier to archive. Second, targeted quantitative work processing is via extracted ion chromatograms (XICs), and these are typically much faster to calculate/retrieve for MRM. Third, some users have stated that they prefer MRM because there is less likely irrelevant data in the output. Thus, MRM is the preferred method for many situations, but as compared to TOF, MRM has less selectivity among other drawbacks.

The present technology allows for the use of a TOF analysis (or other accurate mass instrumentation) to be used in manner similar to a triple quadrupole MRM that allows for the improved selectivity of TOF to be captured while reducing the file size of the output data. Thus, the benefits of TOF can be realized while eliminating some of the drawbacks of using TOF. Further, the output data may be formatted in a similar manner as MRM to allow for compatibility of post-processing software. More specifically, the present technology is able to sum the intensities of targeted product ions at acquisition time, rather than having to filter out data from a large stored spectrum. By summing the intensities of the product ions at acquisition time, the entire spectrum no longer needs to be stored, and massive amounts of storage space in memory can be saved. Ultimately, data files become much smaller, post-processing becomes faster, and post-processing may be more straightforward (e.g., no need to specify m/z windows). The present technology also creates a simple way for users to transition from triple quadrupole quantitation (e.g., MRM) to accurate mass quantitation (e.g., TOF), which may allow for more direct data comparisons when validating the technique (i.e., the same 'MRM' quantitation method can be used in both cases).

FIG. 1 depicts an example mass analysis system 100 for performing mass spectrometry techniques. In some examples, the system 100 may be a mass spectrometer. The example system 100 includes an ion source device 101, a dissociation device 102, a mass analyzer 103, a detector 104, and computing elements, such as a processor 105 and a memory 106. The ion source device 101 may be an electrospray ion source (ESI) device, for example. The ion source device 101 is shown as part of a mass spectrometer or may be a separate device. The dissociation device 102 may be an Electron-based dissociation (ExD) device or collision-induced dissociation (CID) device, for example. Electron-based dissociation (ExD), ultraviolet photodissociation (UVPD), infrared photodissociation (IRMPD) and collision-induced dissociation (CID) are often used as fragmentation techniques for tandem mass spectrometry (MS/MS). ExD can include, but is not limited to, electron capture dissociation (ECD) or electron transfer dissociation (ETD). CID is the most conventional technique for dissociation in tandem mass spectrometers. As described above, in top-down and middle-down proteomics, an intact or digested protein is ionized and subjected to tandem mass spectrometry. ECD, for example, is a dissociation technique that dissociates peptide and protein backbones preferentially.

The mass analyzer 103 can be any type of mass analyzer used for a for performing accurate mass analysis, such as an orbitrap, a time-of-flight (TOF) mass spectrometer, or a Fourier-transform ion cyclotron resonance mass analyzer. The detector 104 may be an appropriate detector for detection ions and generating the signals discussed herein. For example, the detector 104 may include an electron multiplier detector that may include analog-to-digital conversion (ADC) circuitry. The detector 104 may also be an image charge induced detector. An ADC detector detects impacts of ions on the detector to generate a count or intensity of ions. The image-detector an image-charge detector detects oscillations of the ions in the mass analyzer to generate a count or intensity of the ions.

The computing elements of the system 100, such as the processor 105 and memory 106, may be included in the mass spectrometer itself, located adjacent to the mass spectrometer, or be located remotely from the mass spectrometer. In general, the computing elements of the system may be in electronic communication with the detector 104 such that the computing elements are able to receive the signals generated from the detector 104. The processor 105 may include multiple processors and may include any type of suitable processing components for processing the signals and generating the results discussed herein. Depending on the exact configuration, memory 106 (storing, among other things, mass analysis programs and instructions to perform the operations disclosed herein) can be volatile (such as RAM), non-volatile (such as ROM, flash memory, etc.), or some combination of the two. Other computing elements may also be included in the system 100. For instance, the system 100 may include storage devices (removable and/or non-removable) including, but not limited to, solid-state devices, magnetic or optical disks, or tape. The system 100 may also have input device(s) such as touch screens, keyboard, mouse, pen, voice input, etc., and/or output device(s) such as a display, speakers, printer, etc. One or more communication connections, such as local-area network (LAN), wide-area network (WAN), point-to-point, Bluetooth, RF, etc., may also be incorporated into the system 100.

Figure 2:
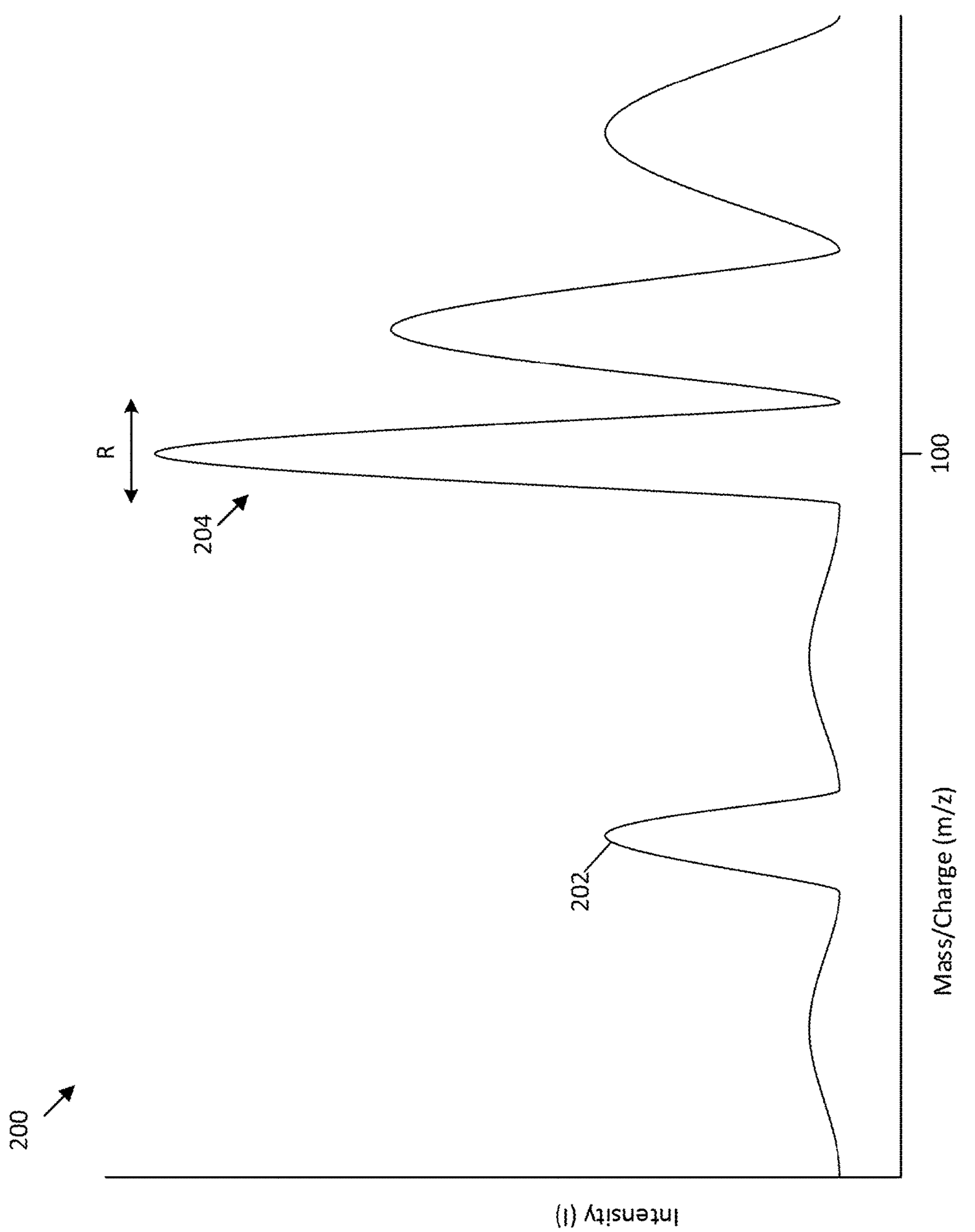
FIG. 2 illustrates an example of a mass spectrum.

FIG. 2 illustrates an example of a fragment mass spectrum 200 with a target range (R) indicated on the spectrum. The mass spectrum 200 has an x-axis of mass-to-charge (m/z) and a y-axis of intensity (e.g., counts of ions). In the example spectrum 200, a peak 204 of interest is centered at 100 Da. To analyze a sample with such a peak 204 of interest (e.g., to analyze product ions having a m/z value of 100), either TOF or MRM could have been used in the past, as discussed above.

With an MRM instrument such as a triple quadrupole, Q1 may be selected to allow the precursor ions to pass through the first quadruple, and Q3 may be set to 100 Da to only allow product ions at about 100 Da (e.g., within some range, such as 1 Da, around 100 Da) to pass through the third quadrupole. Thus, in MRM, only ions between roughly 99-101 Da ever reach the detector. With a prior TOF experiment, the entire spectrum is generated and stored, and the peak 204 may be analyzed in the context of the present spectrum.

In contrast, the present technology allows for a TOF instrument to sum ions at a target m/z range (R) around a target mass-to-charge (m/z) ratio without having to store the entire spectrum. Such summing and/or filtering may be performed at acquisition time such that data that is not of interest is not recorded in the first place (e.g., at acquisition). In some examples, the time-stamp data and/or individual bin data may also not need to be stored, and a single number representing the total ion count or intensity may be all that has to be stored for the target m/z range. The result for the target range (R) may also be stored in an MRM data format rather than a TOF-based format. Such an MRM data format may be a mzML format as discussed in Martens, Lennart et al. "mzML—a community standard for mass spectrometry data." *Molecular & cellular proteomics: MCP* vol. 10, 1 (2011): R110.000133. doi:10.1074/mcp.R110.000133. Thus, for users who routinely use MRM to perform quantitation, if they were to move to quantitation with TOF, then the user could still continue using software that receives MRM file formats even though the analysis was performed with TOF. As a result, the selectivity benefits of TOF can be captured with the lower storage benefits of MRM, all while maintaining compatibility with current workflows and software.

Because the present technology also uses a TOF (or other accurate mass analysis device) with a higher selectivity, the target range (R) may be narrower than with an MRM and still produce accurate counts for the target product ion. In some instances, the resultant counts or intensities may be more accurate than the results from an MRM because the inclusion of the ions other than the target ion are made less likely due to the increased selectivity of the TOF.

Figure 3:
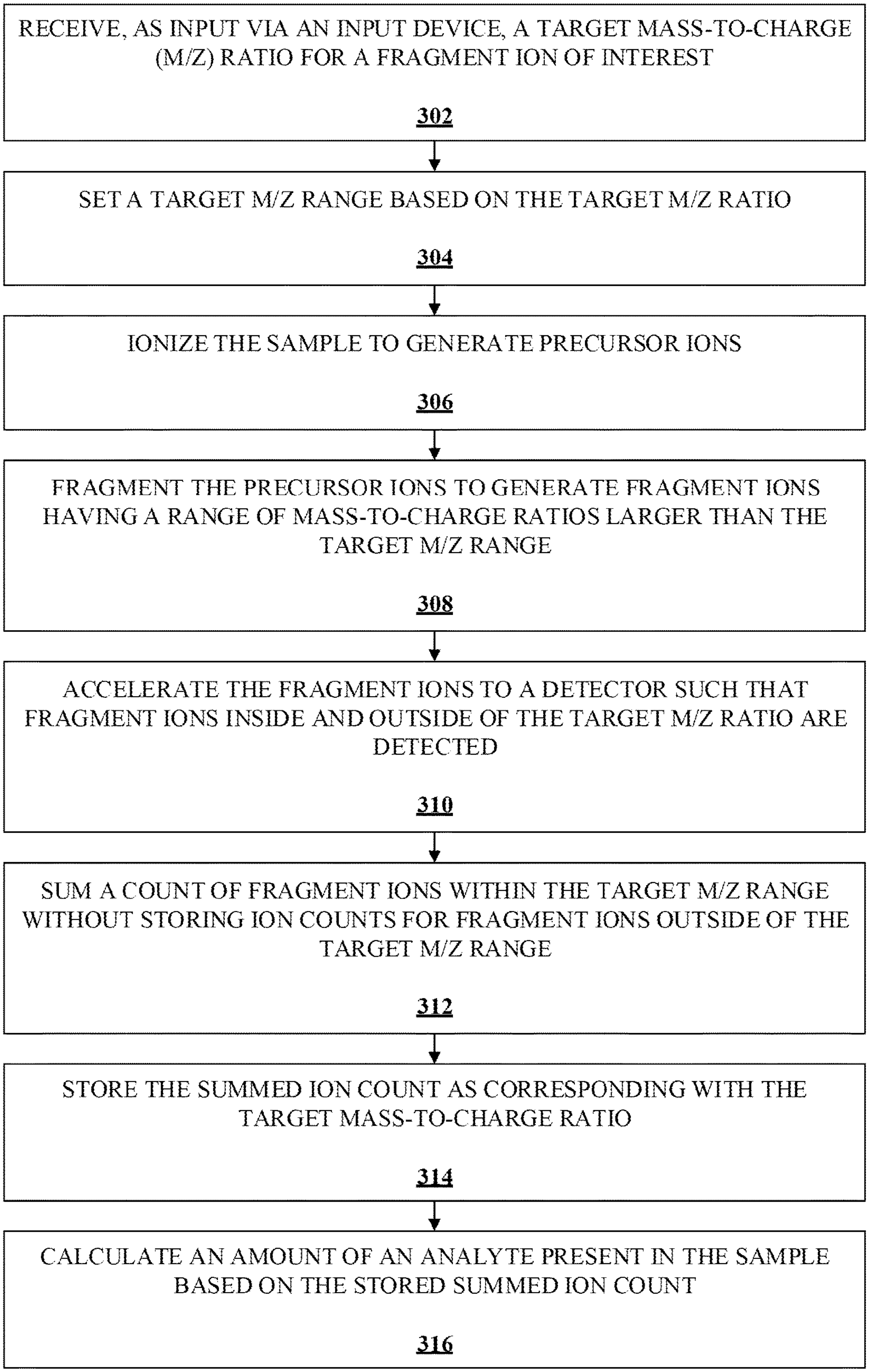
FIG. 3 depicts an example method for performing mass spectrometry according to the present technology.

FIG. 3 depicts an example method 300 for performing mass spectrometry according to the present technology. The method 300 may be performed by the system 100 describe above and/or components thereof. At operation 302, a target m/z ratio for a fragment ion of interest is received via a user interface of the system. For example, user may set the target m/z ratio that is of interest to the user. The user may also set a precursor m/z ratio that allows for the system to properly filter precursor ions prior to their fragmentation to help ensure only precursor ions of interest are fragmented. The system may include a quadrupole or other filtering element that allows precursor ion withing a range of the precursor m/z ratio to pass and reach the dissociation device. In an analogy to MRM, the precursor target m/z ratio may be similar to a Q1 value and the target m/z ratio of the fragment ion may be similar to a Q3 value.

At operation 304, a target m/z range is set based on the target m/z ratio received in operation 302. The target m/z range may be an m/z range around the target m/z ratio, such as 1 Da, 0.1 Da, or some other range. For example, if the target m/z ratio is 100 Da, the target m/z range may be 99.9 to 100.1 Da. The target m/z range may be based on further user input or generated automatically. For example, the user may manually set the range or the width of the range. In other examples, the range may have a default value or be determined based on the characteristics of the compound that is being analyzed.

At operation 306, a sample is ionized to generate precursor ions. The precursor ions may be filtered by a quadrupole or other filter based on the precursor m/z ratio that may be received or set in operation 302. The precursor ions that pass through the filter are then fragmented at operation 308.

Fragmentation of the precursor ions generates fragment ions having a range of mass-to-charge ratios larger than the target m/z range. For example, where the target m/z range is 99.9-100.1 Da, the fragment ions produced from the fragmentation of the precursor ions will have m/z ratios both within and outside of that target m/z range. At operation 310, the fragment ions are accelerated to a detector such that the fragment ions inside and outside of the target m/z ratio are detected. The acceleration and detection may be performed in TOF analyzer, an Orbitrap, a Fourier-transform ion cyclotron resonance mass analyzer, or another accurate mass spectrometry system that is not an MRM system (such as triple quadrupole).

At operation 312, at acquisition time (e.g., as the ions are detected), a count of fragment ions within the target m/z range is summed. In some examples, the count of fragment ions is summed without storing ion counts for fragments outside of the target m/z range. For instance, the only time the system is summing a count is when fragment ions within the target m/z range are being detected. In a TOF system, such an implementation may be achieved by determining an arrival time window for the target m/z range. Generally, when an ion in detected in TOF, the m/z ratio for that ion is determined based on the ion's arrival time at the detector. In the present technology, that algorithm may be effectively reversed to convert the target m/z range to an arrival time range. For example, given the target m/z range, a corresponding arrival time range or window may be calculated. Accordingly, to sum the fragment ions have m/z ratios within the target m/z range, the system need only sum the count of ions within the calculated arrival time range. The fragment ions arriving outside of the calculated arrival time range may be effectively ignored or discarded, which allows for file size of the data to remain relatively small.

Similar methods may be used for systems implementing Fourier-based detection. For example, in Fourier-based detection, the m/z ratios of the detected ions are determined based on frequencies of the ions as determined through the use of a Fourier transform. Accordingly, the algorithm here can also be reversed to convert a target m/z range to a target frequency range. The ions within the target frequency range may then be summed while ignoring or discarding the ion counts outside of the target frequency range.

In addition or alternatively, summing of the ion count within the target m/z range may also include discarding additional data, such as arrival time, frequency, or specific m/z value for the detected fragment ion. For instance, in a TOF system, the bins (or smallest m/z resolution available) in the m/z space are generally much smaller than the target m/z range. Accordingly, the specific m/z value or bin for each detected ion is stored to form the traditional spectra. In the present technology, such additional information may no longer be needed, and exclusion of such information also leads to further reduced file sizes as separate counts for each bin within the target m/z range no longer need to be stored. Viewed in another way, a peak around a particular m/z ratio may be made up of 10 or more data points, and with the present technology those data points are effectively collapsed, at acquisition time, to single data point which is a sum of the values of those data points.

At operation 314, the summed ion count from operation 312 is stored as corresponding with the target m/z ratio. Thus, a single number representing the ion count or intensity may be stored as corresponding to the target m/z ratio. The summed ion count may be stored in a table, array, matrix, or other format that allows for sufficient correspondence and later identification that the stored summed ion count is associated with the target m/z ratio. At operation 316, an amount of an analyte corresponding to the fragment ion of interest may be calculated based on the stored summed ion count.

Figure 4:
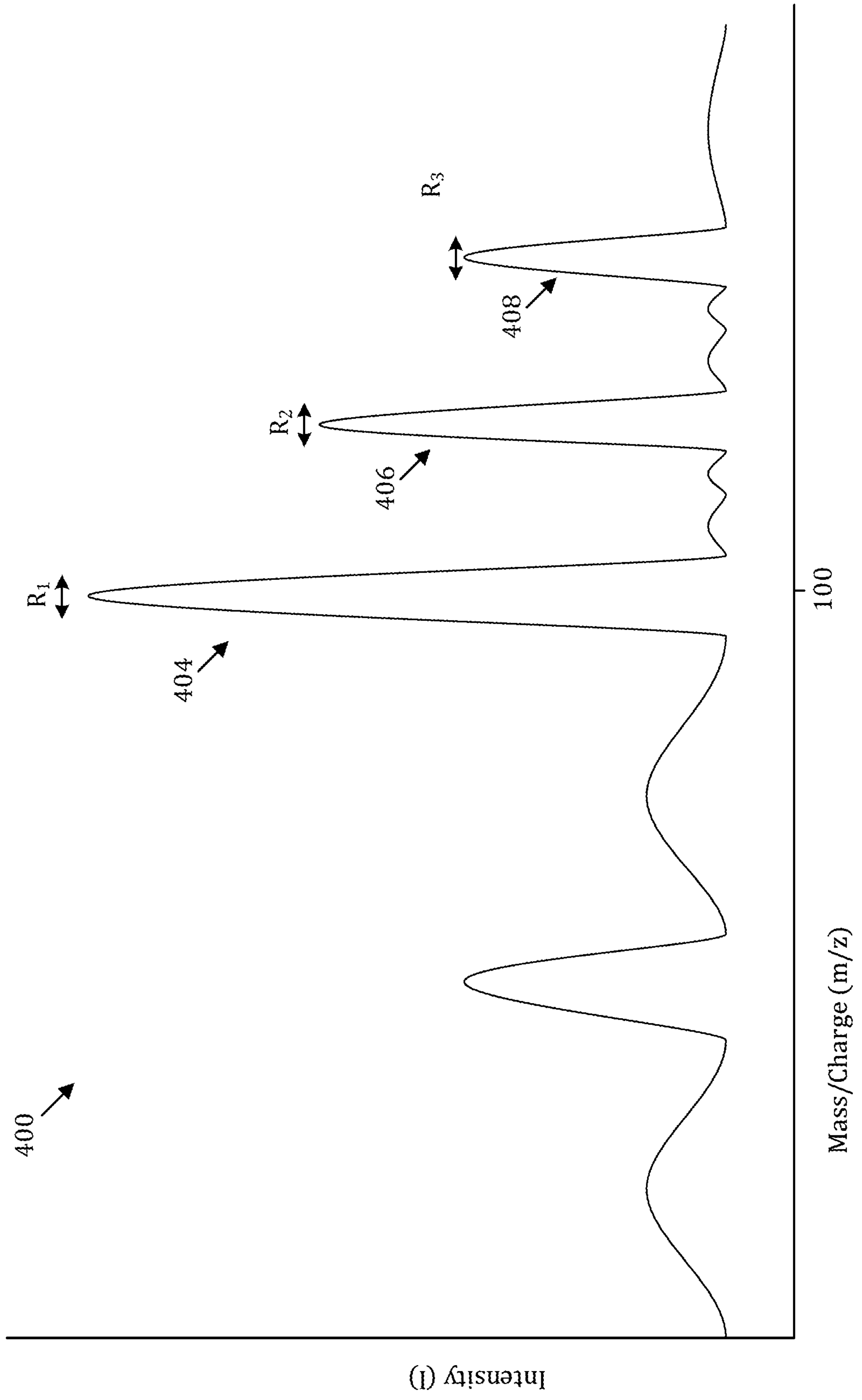
FIG. 4 depicts an example spectrum with isotopic peaks.

In some examples, multiple target m/z ranges may be utilized such that the summed ion count is for the multiple target m/z ranges. The multiple m/z ranges may be determined by manual selection or input, such as user input indicating multiple ranges or multiple target m/z ratios. The multiple m/z ranges may also be determined automatically based on the characteristics of the sample, such as known isotopic clusters in the sample and/or the charge state of the sample. For example, FIG. 4 depicts an example spectrum 400 with isotopic peaks, including a first isotopic peak 404, a second isotopic peak 406, and a third isotopic peak 408. The isotopic peaks are evenly distributed based on the charge state of the fragment ions. For instance, each different isotope is for the same molecule or element having a different number of neutrons. Thus, for each additional neutron, the peak shifts by a known amount proportional to the charge state. As a simple example, for a charge state of 1, each isotopic peak is offset by 1 Da. For a charge state of 2, each isotopic peak is offset by 0.5 Da.

The total count of ions forming each of the isotopic peaks may be desired for particular experiments or analyses, usually to increase sensitivity. Accordingly, multiple target m/z ranges may set based on the isotopic nature of the compound and the charge state. For instance, a user may set the target m/z ratio to be 100 Da corresponding to the primary peak 404, and a first target m/z range ($R_1$) may be set. The user may input information about the compound and/or the charge state of the fragment ions of interest. Based on that information, additional target ranges may be automatically set for the additional isotopic peaks. For example, a second target m/z range ($R_2$) for the second isotopic peak 406 and a third target m/z range ($R_3$) may be determined for the third isotopic peak 408. These additional ranges that are based on the characteristics of the compound or analyte and/or the corresponding charge state may be referred to as analyte-based m/z ranges.

The total count of ions may then be summed for each of the target m/z ranges either together or separately. For example, the target m/z ranges may be converted to arrival time ranges. The ion counts within the combined arrival time ranges may be summed to a single value. In another example, the ion counts for each range may be stored separately such that an intensity for each isotope peak may be determined.

By using a TOF system instead of an MRM system, the ranges $R_1$, $R_2$, and $R_3$ may be relatively narrow such that any detected ions having m/z values between the isotopic peaks are not included in the final result, which leads to a more accurate result. For example, small peaks are present between the first isotopic peak 404 and the second isotopic peak 406. Those small peaks are due to fragment ions that are not of interest in this example. By using a TOF, the ranges $R_1$ and $R_2$ can be set such that the counts of ions forming those small peaks are not included in the total count.

Figure 5:
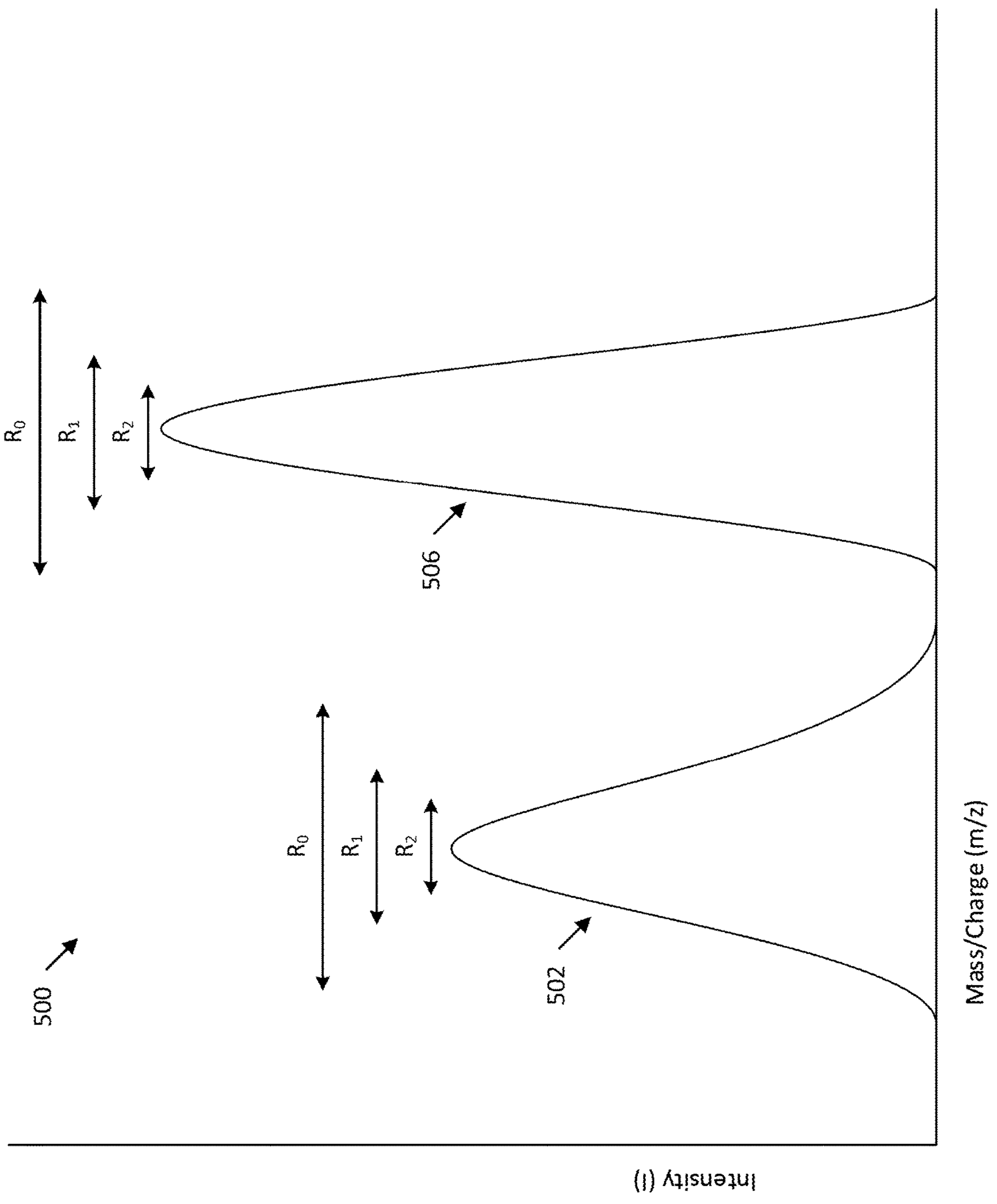
FIG. 5 illustrates an example of a mass spectrum with ranges of different target mass/charge ratios.

FIG. 5 depicts another example of a mass spectrum 500 with target m/z ranges and subranges. A first peak 502 and a second peak 504 are shown in the spectrum 500. A user may be interested in fragment ions having m/z ratios corresponding to the first peak 502 and the second peak 504. Accordingly, a user may enter a first target m/z ratio and a second m/z ratio. For each target m/z ratio, a target m/z range ($R_0$) and first target m/z subrange ($R_1$) that is narrower than the target m/z range ($R_0$) may be set. In some examples, additional subranges may also be set, such as a second target m/z subrange ($R_2$) that is narrower than the first target m/z subrange ($R_1$).

When running an experiment or analysis, the ranges and subranges may be used in a similar manner as discussed above with reference to the single target m/z range. For instance, the system may sum a count of fragment ions within the first target m/z subrange, and that summed count may be stored as a first subrange count. Similarly, the system may sum a count of fragment ions within the second target m/z subrange, and that summed count may be stored as a second subrange count. The subrange counts may all be calculated concurrently with the count for the primary target m/z range. Such a feature is not possible in MRM, which would require multiple experiments to be run at different Q3 settings.

Figure 6A:
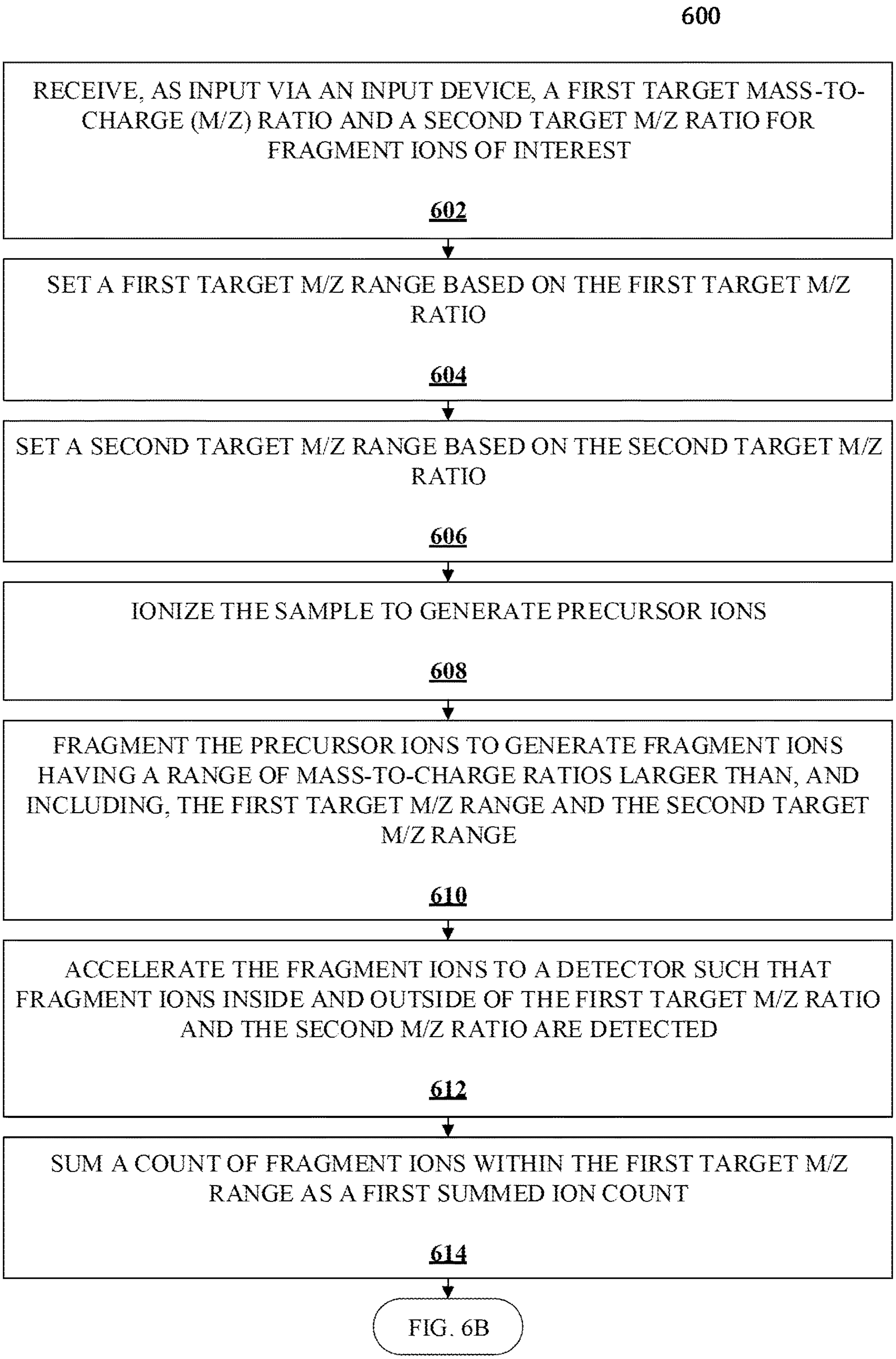
FIGS. 6A-6B depict another example method for performing mass spectrometry according to the present technology.
Figure 6B:
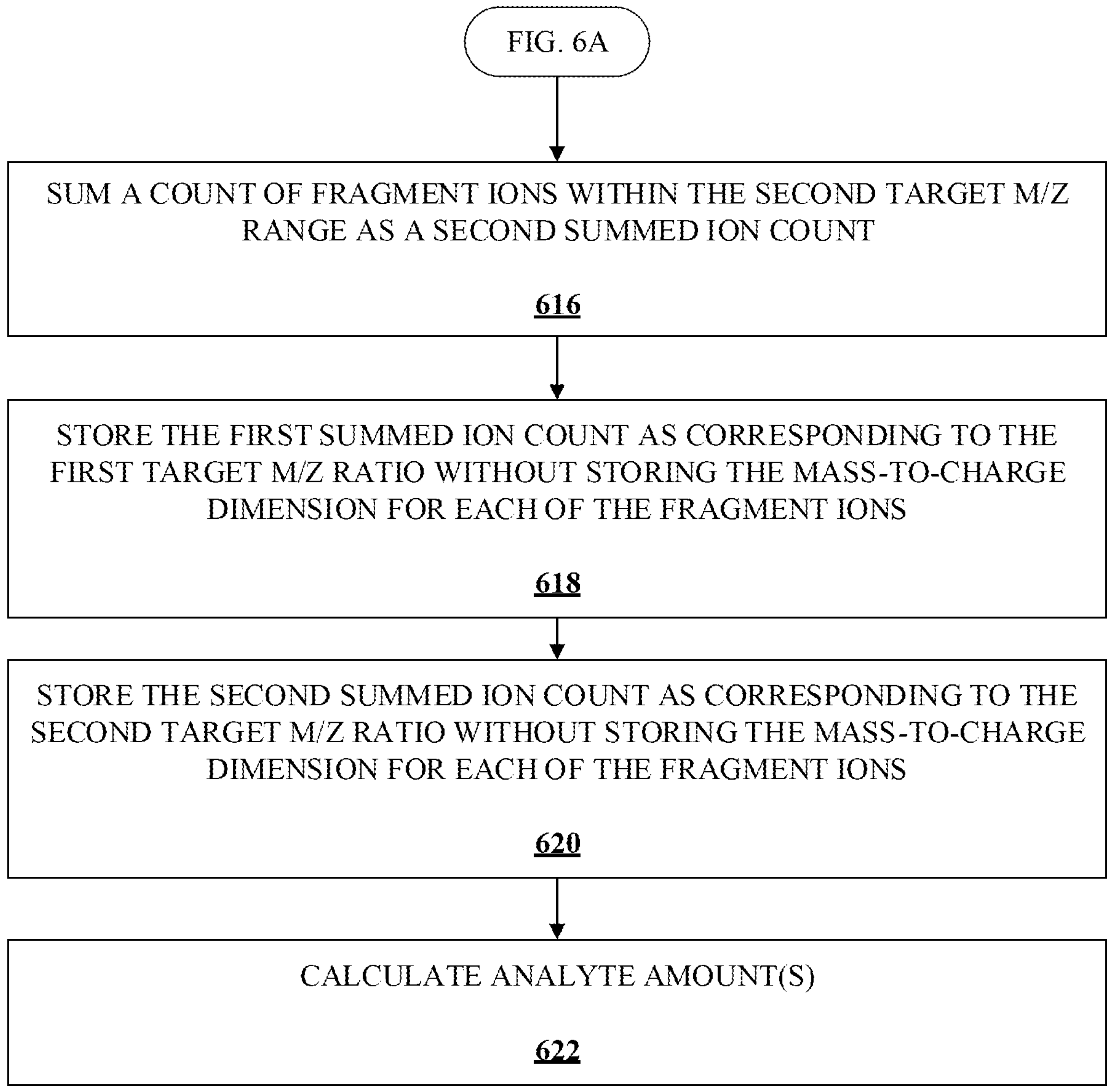

FIGS. 6A-B depict another example method 600 for performing mass spectrometry according to the present technology. The method 600 may be performed by the system 100 describe above and/or components thereof. The method 600 is similar to the method 300 described above with respect to FIG. 3, but in method 600 two different target m/z ratios are utilized. The results may be used to determine the amount of one or more analytes present in the sample.

At operation 602, a first target m/z ratio and a second target m/z ratio for fragment ions of interest are received as input via an input device of the system. For example, a user may set the two ratios through an interface of system. A precursor m/z ratio may also be set in a similar manner as discussed above.

At operation 604, a first target m/z range is set based on the first target m/z ratio received in operation 602. At operation 606, a second target m/z range is set based on the second target m/z ratio received in operation 602. The target m/z ranges set in operations 604 and 606 may be set in similar manners as discussed above. For example, the target m/z ranges may be based on further user input or generated automatically. For example, the user may manually set the ranges or the width of the ranges. In other examples, the ranges may have default values or be determined based on based on characteristics of the compound that is being analyzed, such as charge state. In some cases, the first target m/z range may have the same width as the second target m/z range. In other examples, the first target m/z range may have a different width as the second target m/z range.

At operation 608, a sample is ionized to generate precursor ions. The precursor ions may be filtered by a quadrupole or other filter based on the precursor m/z ratio that may be received or set in operation 602. The precursor ions that pass through the filter are then fragmented at operation 610. Fragmentation of the precursor ions generates fragment ions having a range of mass-to-charge ratios larger than, and including, the first target m/z range and the second target m/z range. At operation 612, the fragment ions are accelerated to a detector such that the fragment ions inside and outside of the first target m/z ratio and the second target m/z ratio are detected. The acceleration and detection may be performed in TOF analyzer, an Orbitrap, a Fourier-transform ion cyclotron resonance mass analyzer, or another accurate mass spectrometry system that is not an MRM system (such as triple quadrupole).

At operation 614, at acquisition time (e.g., as the ions are detected), a count of fragment ions within the first target m/z range is summed as a first summed ion count. At operation 616, a count of fragment ions within the second target m/z range is summed as a second summed ion count. Summing of the fragment ions may be performed in any of the manners as discussed above. In an example where a TOF system is used, the first target m/z range may be converted to a first arrival time range, and the second target m/z range may be converted to a second arrival time range. In other examples where a Fourier-based system is used, the first target m/z range may be converted to a first frequency range, and the second target m/z range may be converted to a second frequency range. The arrival time ranges and/or the frequency ranges may be used as described above for summing the ion counts.

In addition or alternatively, summing of the ion count within the target m/z range may also include discarding additional data, such as arrival time, frequency, or specific m/z value for the detected fragment ion. For instance, in a TOF system, the bins (or smallest m/z resolution available) in the m/z space are generally much smaller than the target m/z range. Accordingly, the specific m/z value or bin for each detected ion is stored to form the traditional spectra. In the present technology, such additional information may no longer be needed, and exclusion of such information also leads to further reduced file sizes as separate counts for each bin within the target m/z range no longer need to be stored. This additional data or information may be referred the m/z dimension for the detected ions.

At operation 618, the first summed ion count is stored as corresponding to the first target m/z ratio. The first summed ion count may be stored without storing the m/z dimension for each of the counted fragment ions. At operation 620, the second summed ion count is stored as corresponding to the second target m/z ratio. The second summed ion count may be stored without storing the m/z dimension for each of the counted fragment ions. At operation 622, analyte amounts or concentrations within the samples may be calculated. For example, an amount of a first analyte present in the sample may be calculated based on the stored first summed ion count, and an amount of a second analyte present in the sample may be calculated based on the stored second ion count. Additionally or alternatively, an amount of a single analyte present in the sample may be calculated based on the stored first summed ion count and the second summed ion count.

Those skilled in the art will recognize that the methods and systems of the present disclosure may be implemented in many manners and as such are not to be limited by the foregoing aspects and examples. In other words, functional elements being performed by a single component, or multiple components, in various combinations of hardware and software or firmware, and individual functions, can be distributed among software applications at either the client or server level or both. In this regard, any number of the features of the different aspects described herein may be combined into single or multiple aspects, and alternate aspects having fewer than or more than all of the features herein described are possible.

Functionality may also be, in whole or in part, distributed among multiple components, in manners now known or to become known. Thus, a myriad of software/hardware/firmware combinations are possible in achieving the functions, features, interfaces, and preferences described herein. Moreover, the scope of the present disclosure covers conventionally known manners for carrying out the described features and functions and interfaces, and those variations and modifications that may be made to the hardware or software firmware components described herein as would be understood by those skilled in the art now and hereafter. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

Further, as used herein and in the claims, the phrase "at least one of element A, element B, or element C" is intended to convey any of: element A, element B, element C, elements A and B, elements A and C, elements B and C, and elements A, B, and C. In addition, one having skill in the art will understand the degree to which terms such as "about" or "substantially" convey in light of the measurement techniques utilized herein. To the extent such terms may not be clearly defined or understood by one having skill in the art, the term "about" shall mean plus or minus ten percent.

Numerous other changes may be made which will readily suggest themselves to those skilled in the art and which are encompassed in the spirit of the disclosure and as defined in the appended claims. While various aspects have been described for purposes of this disclosure, various changes and modifications may be made which are well within the scope of the disclosure. Numerous other changes may be made which will readily suggest themselves to those skilled in the art and which are encompassed in the spirit of the disclosure and as defined in the claims.

What is claimed is:

1. A method for performing mass spectrometry analysis of a sample, the method comprising:

receiving, as input via an input device, a target mass-to-charge (m/z) ratio for a fragment ion of interest;

setting a target m/z range based on the target m/z ratio;

ionizing the sample to generate precursor ions;

fragmenting the precursor ions to generate fragment ions having a range of mass-to-charge ratios larger than the target m/z range;

accelerating the fragment ions to a detector such that fragment ions inside and outside of the target m/z ratio are detected;

summing a count of fragment ions within the target m/z range without storing ion counts for fragment ions outside of the target m/z range; and storing the summed ion count as corresponding with the target mass-to-charge ratio.

2. The method of claim 1, further comprising calculating an amount of an analyte present in the sample based on the stored summed ion count.

3. The method of claim 1, wherein detection of the fragment ions is performed with a mass analyzer that is one of a time-of-flight (TOF) mass analyzer, an orbitrap mass analyzer, or a Fourier-transform ion cyclotron resonance mass analyzer.

4. The method of claim 1, further comprising:

setting a first target m/z subrange that is smaller than the target m/z range;

setting a second target m/z subrange that is smaller than the first target m/z subrange;

summing a count of fragment ions within the first target m/z subrange as a first subrange count;

summing a count of fragment ions within the second target m/z subrange as a second subrange count; and storing the first subrange count and the second subrange count.

5. The method of claim 1, further comprising, based on the target m/z ratio, setting analyte-based m/z range that is based on one or more characteristics of an analyte for the sample, wherein the analyte-based m/z range is included in the target m/z range.

6. The method of claim 1, wherein the target m/z range is further based on at least one of a charge state or an isotopic cluster of the target compound.

7. The method of claim 1, further comprising:

converting the target m/z range to an arrival time range; and wherein summing a count of fragment ions includes summing the count of ions arriving at the detector during the arrival time range.

8. A mass spectrometry system comprising:

an ionization device for ionizing a sample into precursor ions;

a dissociation device configured to fragment precursor ions into fragment ions;

a mass analyzer, including a detector, for detecting the fragment ions from the dissociation device, wherein the mass analyzer is one of a time-of-flight (TOF) mass analyzer, an orbitrap mass analyzer, or a Fourier-transform ion cyclotron resonance mass analyzer;

an input device for receiving input;

at least one processor; and memory storing instructions that, when executed by the at least one processor, cause the system to perform operations comprising:

receive, as input via the input device, a target mass-to-charge (m/z) ratio for a fragment ion of interest;

set a target m/z range based on the target m/z ratio;

ionize, by the ionization device, the sample to generate precursor ions;

fragment, by the dissociation device, the precursor ions to generate fragment ions having a range of mass-to-charge ratios larger than the target m/z range;

detect, by the mass analyzer, the fragment ions;

sum a count of fragment ions within the target m/z ratio without storing ion counts for fragment ions outside of the target m/z range; and store the summed ion count as corresponding with the target mass-to-charge ratio.

9. The mass spectrometry system of claim 8, wherein the operations further comprise:

calculate an amount of an analyte present in the sample based on the stored summed ion count.

10. The mass spectrometry system of claim 8, wherein the target m/z range is based on additional input received via the input device.

11. The mass spectrometry system of claim 8, further comprising a quadrupole for filtering the precursor ions.

12. The mass spectrometry system of claim 8, wherein the operations further comprise:

filter, by the quadrupole, the precursor ions based on a user input.

13. The mass spectrometry system of claim 8, wherein the mass analyzer is a TOF mass analyzer and the operations include:

convert the target m/z range to an arrival time range; and wherein summing the count of fragment ions includes summing the count of ions arriving at the detector during the arrival time range.

14. The mass spectrometry system of claim 8, wherein the operations further comprise:

convert the target m/z range to an arrival time range; and wherein summing a count of fragment ions includes summing a count of ions arriving at the detector during the arrival time range.

15. A method for performing mass spectrometry analysis of a sample, the method comprising:

receiving, as input via an input device, a first target mass-to-charge (m/z) ratio and a second target m/z ratio for fragment ions of interest;

setting a first target m/z range based on the first target m/z ratio;

setting a second target m/z range based on the second target m/z ratio;

ionizing the sample to generate precursor ions;

fragmenting the precursor ions to generate fragment ions having a range of mass-to-charge ratios larger than, and including, the first target m/z range and the second target m/z range;

accelerating the fragment ions to a detector such that fragment ions inside and outside of the first target m/z ratio and the second m/z ratio are detected;

summing a count of fragment ions within the first target m/z range as a first summed ion count;

summing a count of fragment ions within the second target m/z range as a second summed ion count;

storing the first summed ion count as corresponding to the first target m/z ratio without storing the mass-to-charge dimension for each of the fragment ions; and storing the second summed ion count as corresponding to the second target m/z ratio without storing the mass-to-charge dimension for each of the fragment ions.

16. The method of claim 15, further comprising:

calculating an amount of a first analyte present in the sample based on the stored first summed ion count; and calculating an amount of a second analyte present in the sample based on the stored second summed ion count.

17. The method of claim 15, further comprising calculating an amount of an analyte present in the sample based on the stored first summed ion count and the second summed ion count.

18. The method of claim 15, further comprising:

converting the first target m/z range to a first arrival time range;

converting the second target m/z range to a second arrival time range; and wherein summing a count of fragment ions includes summing the count of ions arriving at the detector during the first arrival time range and the second arrival time range.

19. The method of claim 15, further comprising:

converting the first target m/z range to a first frequency range;

converting the second target m/z range to a second frequency range; and wherein summing a count of fragment ions includes summing the count of ions having a detected frequency in the first frequency range and the second frequency range.

20. The method of claim 15, wherein detection of the fragment ions is performed using a mass analyzer that is one of a time-of-flight (TOF) mass analyzer, an orbitrap mass analyzer, or a Fourier-transform ion cyclotron resonance mass analyzer.

* * * * *